United States Patent Office 3,287,430
Patented Nov. 22, 1966

3,287,430
INHIBITING POLYMERIZATION
Paul Gordon Haines and Harry Elmer Albert, Lafayette Hill, and Alfred Case Whiton, Blue Bell, Pa., assignors to Pennsalt Chemicals Corporation, Philadelphia, Pa., a corporation of Pennsylvania
No Drawing. Filed Sept. 15, 1964, Ser. No. 396,732
6 Claims. (Cl. 260—666.5)

This invention relates to the stabilization of vinyl aromatic compounds and to the stabilized compounds so obtained. More particularly, the invention is concerned with the use of N-cyclohexylhydroxylamine as a stabilizer to prevent the premature polymerization of vinyl aromatic compounds, particularly styrene.

In accord with the disclosure of U.S. Patent 2,965,685, it is known to stabilize vinyl aromatic compounds such as styrene with N,N-dialkylhydroxylamines. As disclosed in that patent, the N,N-dialkylhydroxylamines which are useful stabilizers for vinyl aromatic compounds are those which contain 1 to 4 carbon atoms in each alkyl group and may be symmetrical or unsymmetrical N,N-dialkylhydroxylamines.

N-monoalkylhydroxylamines are known compounds and are known to be generally unstable at room temperature. Furthermore, when the more stable N-monoalkylhydroxylamine salts are evaluated as stabilizers for vinyl aromatic compounds they show very low activity and are very much inferior to the N,N-dialkylhydroxylamines. However, we have now found that the stable N-cyclohexylhydroxylamine (white crystalline sold melting at 141° C.) is surprisingly much more active than even N,N-dialkylhydroxylamines as stabilizers for vinyl aromatic compounds.

In order to illustrate the invention the following comparisons are given:

A dilatometric method similar to that described in U.S. Patent 2,965,685 was used to evaluate the stabilizing effect of N-cyclohexylhydroxylamine and N,N-diethylhydroxylamine on styrene. The dilatometer used has a bulb of approximately 25 ml. capacity and an 80 cm. capillary stem of 2 mm. bore. The dilatometer containing the styrene charge was placed in a constant temperature bath maintained at 120° C. As polymerization progressed the liquid contracted and the level in the capillary provided a direct measure of the amount of polymerization. The observation time at 120° C. was 2 hours. The following Table 1 clearly indicates the surprisingly large stabilizing effect obtained when 0.5% of N-cyclohexylhydroxylamine is added to freshly distilled styrene monomer. As can be seen, the stabilizing effect with N-cyclohexylhydroxylamine is much greater than that obtained with the same concentration of N-methylhydroxylamine oxalate, N-isopropylhydroxylamine oxalate and N,N-diethylhydroxylamine.

TABLE 1

Stabilization of styrene monomer with N-cyclohexylhydroxylamine and N,N-diethylhydroxylamine

| Inhibitor (0.5%) | Loss in Height in 2 hrs. at 120° C. | |
|---|---|---|
| | Cm. | Percent of blank |
| Blank | 71.0 | |
| N-methylhydroxylamine oxalate | 47.3 | 66.6 |
| N-isopropylhydroxylamine oxalate | 23.2 | 32.6 |
| N,N-diethylhydroxylamine | 14.2 | 20.0 |
| N-cyclohexylhydroxylamine | 2.9 | 4.1 |

When used to inhibit styrene and related vinyl aromatic compounds such as α-methyl styrene, 3-methylated styrenes and ring chlorinated styrenes, divinyl benzene, ethyl vinyl benzene, vinyl naphthalene, and the like, N-cyclohexylhydroxylamine is non-discoloring and completely compatible with the monomer. Because of its extreme effectiveness N-cyclohexylhydroxylamine can be used at very low concentrations. For example, when storage of the vinyl aromatic compound is to be at low temperatures an amount of N-cyclohexylhydroxylamine may be used as little at 0.01% by weight of the aromatic compound may be used. When storage of the monomer is at temperatures of about 120° C. and higher, somewhat larger amounts on the order of 1.0% are satisfactory.

Having described our invention, it will be understood that numerous variations and changes may be made from the above description and examples without departing from its spirit and scope.

We claim:
1. A composition comprising a monomeric vinyl aromatic compound containing an amount of N-cyclohexylhydroxylamine sufficient to inhibit polymerization of said vinyl aromatic compound.
2. A composition comprising a styrene monomer containing an amount of N-cyclohexylhydroxylamine sufficient to inhibit polymerization of said styrene.
3. A composition comprising styrene and an amount of N-cyclohexylhydroxylamine sufficient to inhibit polymerization of said styrene.
4. The method of preventing polymerization of a monomeric vinyl aromatic compound which comprises incorporating in said vinyl aromatic compound an amount of N-cyclohexylhydroxylamine sufficient to inhibit polymerization.
5. The method of preventing polymerization of a styrene monomer which comprises incorporating therein an amount of N-cyclohexylhydroxylamine sufficient to inhibit the polymerization of said monomer.
6. The method of preventing polymerization of styrene which comprises incorporating in said styrene an amount of N-cyclohexylhydroxylamine sufficient to inhibit polymerization.

References Cited by the Examiner
UNITED STATES PATENTS
3,148,225  9/1964  Albert _____ 260—666.5

DELBERT E. GANTZ, Primary Examiner.
C. R. DAVIS, Assistant Examiner.